United States Patent
Balmer et al.

(10) Patent No.: US 7,039,795 B2
(45) Date of Patent: May 2, 2006

(54) SYSTEM AND METHOD FOR USING A TWO-STAGE MULTIPLEXING ARCHITECTURE FOR PERFORMING COMBINATIONS OF PASSING, REARRANGING, AND DUPLICATING OPERATIONS ON DATA

(75) Inventors: Keith Balmer, Bedford (GB); Karl M. Guttag, Plano, TX (US); Amarjit Singh Bhandal, Daventry (GB)

(73) Assignee: Texas Instruments Incorporated, Dallas, TX (US)

( * ) Notice: Subject to any disclaimer, the term of this patent is extended or adjusted under 35 U.S.C. 154(b) by 465 days.

(21) Appl. No.: 10/172,221

(22) Filed: Jun. 14, 2002

(65) Prior Publication Data
US 2003/0233529 A1   Dec. 18, 2003

(51) Int. Cl.
    *G06F 9/315* (2006.01)
(52) U.S. Cl. ...................................... 712/300
(58) Field of Classification Search ................ 712/300, 712/223, 224
    See application file for complete search history.

(56) References Cited

U.S. PATENT DOCUMENTS

| | | | |
|---|---|---|---|
| 5,233,690 A | | 8/1993 | Sherlock et al. ............ 395/165 |
| 5,423,010 A | * | 6/1995 | Mizukami ..................... 341/60 |
| 5,524,256 A | * | 6/1996 | Turkowski ................... 712/300 |
| 5,537,563 A | | 7/1996 | Guttag et al. ................ 395/427 |
| 5,862,398 A | | 1/1999 | Hampapuram et al. 395/800.24 |
| 5,875,355 A | * | 2/1999 | Sidwell et al. .............. 712/300 |
| 5,995,080 A | | 11/1999 | Biro et al. ................... 345/154 |
| 6,178,471 B1 | | 1/2001 | Barrett et al. ................. 710/52 |
| 6,381,690 B1 | * | 4/2002 | Lee ............................ 712/223 |
| 6,516,390 B1 | | 2/2003 | Chilton et al. .............. 711/138 |
| 6,629,239 B1 | * | 9/2003 | Steele, Jr. ................... 712/300 |

* cited by examiner

*Primary Examiner*—Eddie Chan
*Assistant Examiner*—David J. Huisman
(74) *Attorney, Agent, or Firm*—Robert D. Marshall, Jr.; W. James Brady, III; Frederick J. Telecky, Jr.

(57) ABSTRACT

A method for processing data using a multiplexing architecture includes performing a selected one of a plurality of first multiplexer operations on the data and then a selected one of a plurality of second multiplexer operations. The first multiplexer operations include a pass operation and a plurality of bit rearrangement operations. The second multiplexer operations include a pass operation and a plurality of bit duplication operations which duplicates a selected bit or bits to a corresponding block of contiguous bits in the output. A result is then generated that reflects the outputs produced by first and second multiplexers respectively.

88 Claims, 3 Drawing Sheets

FIRST MULTIPLEXER (50)

| | | | | | | | | | | | | | | | | |
|---|---|---|---|---|---|---|---|---|---|---|---|---|---|---|---|---|
| a | b | c | d | e | f | g | h | i | j | k | l | m | n | o | p | pass |
| a | c | e | g | i | k | m | o | q | s | u | w | y | 5 | 3 | 1 | 2-way deal |
| a | e | i | m | q | u | y | 3 | b | f | j | n | r | v | z | 2 | 4-way deal |
| a | q | b | r | c | s | d | t | e | u | f | v | g | w | h | x | 2-way shuffle |

| | | | | | | | | | | | | | | | |
|---|---|---|---|---|---|---|---|---|---|---|---|---|---|---|---|
| q | r | s | t | u | v | w | x | y | z | 5 | 4 | 3 | 2 | 1 | 0 |
| b | d | f | h | j | l | n | p | r | t | v | x | z | 2 | 4 | 0 |
| c | g | k | o | s | w | 5 | 1 | d | h | l | p | t | x | 4 | 0 |
| i | y | j | z | k | 5 | 1 | 4 | m | 3 | n | 2 | o | 1 | p | 0 |

SECOND MULTIPLEXER (60)

| | | | | | | | | | | | | | | | | |
|---|---|---|---|---|---|---|---|---|---|---|---|---|---|---|---|---|
| a | b | c | d | e | f | g | h | i | j | k | l | m | n | o | p | pass |
| h | h | h | h | h | h | h | h | p | p | p | p | p | p | p | p | 8-bit LSB rep |
| o | o | o | o | o | o | o | o | .-. | .-. | .-. | .-. | .-. | .-. | .-. | .-. | 8-bit MSB rep |
| p | p | p | p | p | p | p | p | p | p | p | p | p | p | p | p | 16-bit LSB rep |
| o | o | o | o | o | o | o | o | o | o | o | o | o | o | o | o | 16-bit MSB rep |
| a | a | a | a | a | a | a | a | a | a | a | a | a | a | a | a | 32-bit MSB rep |

| | | | | | | | | | | | | | | | |
|---|---|---|---|---|---|---|---|---|---|---|---|---|---|---|---|
| q | r | s | t | u | v | w | x | y | z | 5 | 4 | 3 | 2 | 1 | 0 |
| x | x | x | x | x | x | x | x | o | o | o | o | o | o | o | o |
| q | q | q | q | q | q | q | q | y | y | y | y | y | y | y | y |
| o | o | o | o | o | o | o | o | o | o | o | o | o | o | o | o |
| q | q | q | q | q | q | q | q | q | q | q | q | q | q | q | q |
| a | a | a | a | a | a | a | a | a | a | a | a | a | a | a | a |

COMBINATIONS (70)

| | | | | | | | | | | | | | | | | |
|---|---|---|---|---|---|---|---|---|---|---|---|---|---|---|---|---|
| 1 | 1 | 1 | 1 | 1 | 1 | 1 | 1 | 1 | 1 | 1 | 1 | 0 | 0 | 0 | 0 | (2-way deal, 16-bit LS rep) |
| o | o | o | o | o | o | o | o | o | o | o | o | b | b | b | b | (2-way deal, 16-bit MS rep) |
| o | o | o | o | o | o | o | o | o | o | o | o | b | b | b | b | pass, 16-bit MS rep |
| 3 | 3 | 3 | 3 | 3 | 3 | 0 | 0 | 2 | 2 | 2 | 2 | b | b | .-. | .-. | (4-way deal, 8-bit LS rep) |
| o | o | o | o | o | o | o | o | 2 | 2 | 2 | 2 | b | b | .-. | .-. | (4-way deal, 8-bit MS rep) |
| o | o | o | o | o | o | o | o | o | o | o | o | b | b | .-. | .-. | pass, 8-bit MS rep |
| o | o | o | o | o | o | o | o | q | q | 1 | 1 | o | o | q | q | 2-way deal, 8-bit MSB rep |
| o | o | o | o | o | o | o | o | q | q | 1 | 1 | o | o | q | q | 2-way deal, 8-bit LSB rep |
| 2 | 2 | 2 | 2 | 2 | 2 | 2 | 2 | q | q | 1 | 1 | o | o | q | q | 4-way deal, 16-bit MSB rep |
| 2 | 2 | 2 | 2 | 2 | 2 | 2 | 2 | q | q | 1 | 1 | o | o | q | q | 4-way deal, 16-bit LSB rep |
| t | t | t | t | t | t | t | t | x | x | x | x | 4 | 4 | r | r | 2-way shuffle, 8-bit LSB rep |
| o | o | o | o | o | o | o | o | e | e | e | e | .-. | .-. | o | o | 2-way shuffle, 8-bit MSB rep |
| x | x | x | x | x | x | x | x | x | x | x | x | .-. | .-. | m | m | 2-way shuffle, 16-bit LSB rep |
| o | o | o | o | o | o | o | o | o | o | o | o | 0 | 0 | 0 | 0 | 2-way shuffle, 16-bit MSB rep |

FIG. 3

SYSTEM AND METHOD FOR USING A TWO-STAGE MULTIPLEXING ARCHITECTURE FOR PERFORMING COMBINATIONS OF PASSING, REARRANGING, AND DUPLICATING OPERATIONS ON DATA

TECHNICAL FIELD OF THE INVENTION

This invention relates in general to the field of data communications and more particularly to a system and method for processing data using a multiplexing architecture.

BACKGROUND OF THE INVENTION

Effective data communications is an integral part of computer system architectures. The ability to properly transmit and suitably present data is critical in virtually every communication system. In certain circumstances, data may need to be rearranged or processed such that a certain portion of information is adequately displayed at its intended destination. Sectioning a data stream into numerous data segments may offer the ability to adequately process the data before it arrives at its intended destination. However, such an approach generally requires additional components for the associated computer architecture and may operate to decrease circuit speed. In addition, sectioning the data into manageable working portions may complicate the associated software, hardware, or circuitry being used to communicate the data stream.

SUMMARY OF THE INVENTION

From the foregoing, it may be appreciated by those skilled in the art that a need has arisen for an improved data processing approach that provides the capability for data segments within a data stream to be suitably processed before arriving at an intended destination. In accordance with one embodiment of the present invention, a system and method for processing data using a multiplexing architecture are provided that substantially eliminate or greatly reduce disadvantages and problems associated with conventional data processing techniques.

According to an embodiment of the present invention, a method for processing data using a multiplexing architecture is provided that includes performing a selected one of a plurality of first multiplexer operations on the data such that a first output is produced. The method also includes performing a selected one of a plurality of second multiplexer operations on the first output such that a second output is produced. A result is then generated that reflects the first and second outputs produced by first and second multiplexers respectively.

Certain embodiments of the present invention may provide a number of technical advantages. For example, in accordance with one embodiment of the present invention, a data processing system is provided that offers an implementation for modifying or for processing a data stream that does not inhibit the speed of the associated system. This is due, in part, to the capability of each multiplexer which provide numerous processing operations without needing to section information prior to executing the selected operation.

Another advantage of a particular embodiment of the present invention is a result of the data processing architecture which allows for specific design considerations in order to generate a desired result based on the input data stream. This is because of the instruction set provided to each of the components within the data processing architecture. By not implementing dedicated functions for each component within the system, the data processing architecture allows for increased flexibility in offering specific design implementation for needs particular to an associated computer system. This would allow, for example, the data processing system to be custom-designed in order to generate a desired set of results or outputs. Additionally, the results or outputs may be varied or modified significantly by changing only the instruction random access memory (RAM), which provides instruction sets to each of the components within the data processing system. Moreover, the instruction RAM may be upgraded or receive different instructions in order to provide varying results based on specific operations to be performed on the incoming data stream. Embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF THE INVENTION

Figure 1:
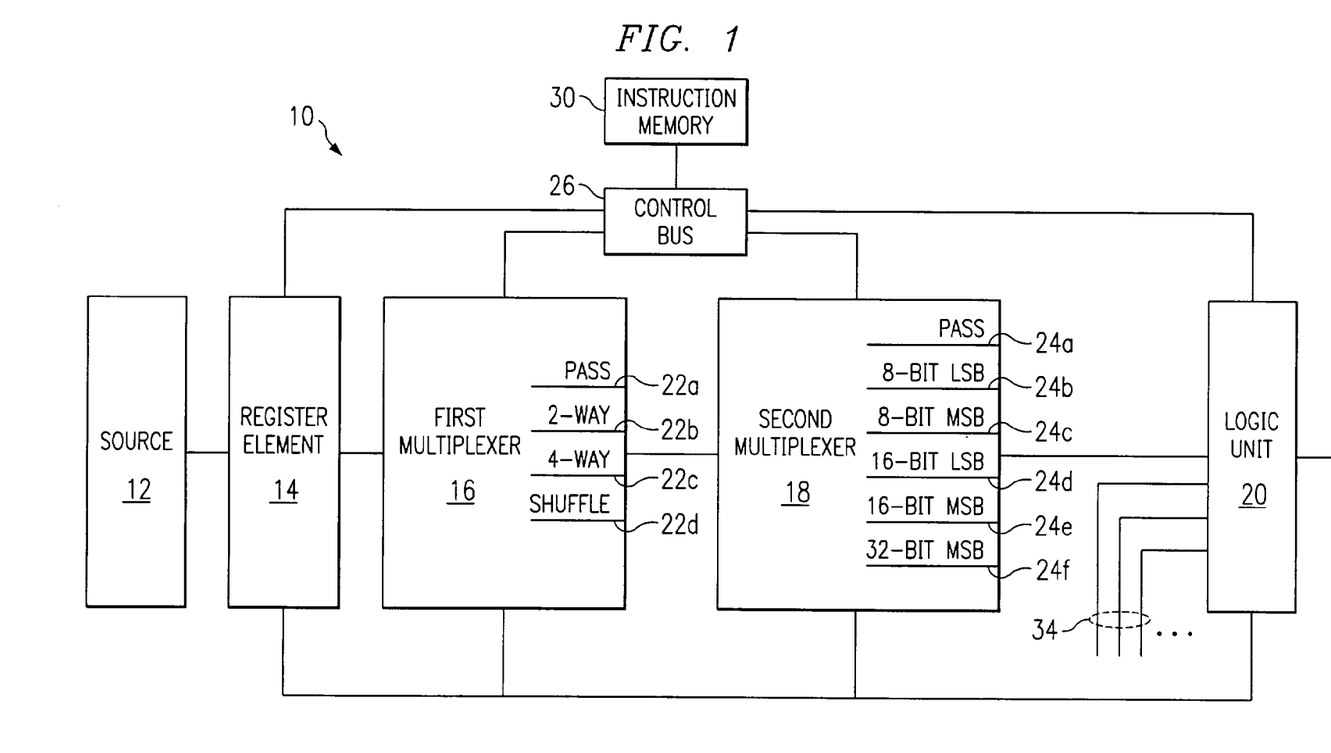
FIG. 1 is a simplified block diagram of a data processing system.

FIG. 1 is a simplified block diagram of a data processing system 10 for providing a selected one of a series of outputs in accordance with one embodiment of the present invention. Data processing system 10 includes a source 12, a register element 14, a first multiplexer 16, a second multiplexer 18, and a logic unit 20. Data processing system 10 also includes a control bus 26 and an instruction memory 30.

According to the teachings of the present invention, first multiplexer 16 operates to receive an input from register element 14 and process that input such that a selected one of a first set of potential outputs 22a–22d may be generated and communicated to second multiplexer 18. Second multiplexer 18 may receive the selected one of potential outputs 22a–22d and further process that information such that a selected one of a second set of potential outputs 24a–24f may be generated and communicated to logic unit 20. Logic unit 20 may then communicate this result to a next destination or communicate this information to either one of first multiplexer 16 or second multiplexer 18 for additional processing. This protocol for processing information offers maximum flexibility to data processing system 10 as multiple multiplexers are capable of generating multiple combinations of data communicated by source 12. Data processing system 10 further allows information input by source 12 and directed by register element 14 to be manipulated or otherwise processed without requiring a sectioning of a corresponding data stream. Accordingly, data processing system 10 may be designed in any particular fashion such that a suitable output result is generated and communicated as an input to logic unit 20.

Source 12 is a node that provides binary or digital information to register element 14. Source 12 may be any element or component that provides a binary or digital stream of information, such as: a video interface, a computer, a database, a program, or any other suitable device operable to communicate data to register element 14. 'Digital' as referred to herein in this document represents any technology that generates, stores, or processes data in terms of two states: positive and non-positive. Positive may generally be expressed or represented by the number '1' where non-positive numbers are represented by the number '0.' Data transmitted or stored with digital technology may be expressed as a string of 0's and 1's. Each of these state digits may be referred to as a bit, where a string of bits that a given unit may receive are collectively referred to as a byte. There are generally 8 bits per byte in digital communications.

Additionally, source 12 may include a storage element and have connections (direct or indirect) to direct memory access (DMA) machines for retrieving information from a designated location. Data processing system 10 may include multiple sources 12, potentially coupled to a multiplexer that determines and selects which source 12 to be communicated to register element 14 and then on to first multiplexer 16. Source 12 may provide a data stream to register element 14 in a 32-bit format (four bytes) or alternatively in any other format, such as a 16-bit format, a 64-bit format, a 128-bit format, or a 256-bit format where appropriate.

Register element 14 is a data storage unit that provides a location for passing data or files to any component within data processing system 10. Alternatively, register element 14 may be any data storage unit, buffer, microprocessor, or any other device or element that facilitates communication between source 12 and first multiplexer 16. Register element 14 receives a data stream in a suitable bit format from source 12. Instruction memory 30 may provide direction or an instruction set to register element 14, via control bus 26, such that register element 14 may select which source 12 (in the case of multiple sources 12) to provide a data stream to first multiplexer 16. In addition, register element 14 may receive timing information or any other suitable communication or processing protocol characteristics from instruction memory 30. Register element 14 receives the data stream from source 12 and communicates the data stream to first multiplexer 16.

First multiplexer 16 is a processing element that generates one of four potential outputs 22a–22d in a particular embodiment of the present invention. First multiplexer 16 receives a data stream from register element 14 and processes the data stream such that it is replicated multiple times in distinct arrangements. Output 22a represents a pass of the data stream where the data bits are unchanged after being received from register element 14. This unchanged output 22a is communicated from first multiplexer 16 to second multiplexer 18. First multiplexer 16 also includes a two way format output 22b. Output 22b represents an output in which every other bit received by first multiplexer 16 is replicated and communicated as an output stream to second multiplexer 18. First multiplexer 16 also includes a four way output format 22c which represents an output in which the data stream received by first multiplexer 16 is modified such that every fourth bit is represented as an output data segment to second multiplexer 18. First multiplexer 16 further includes a shuffle output format 22d which represents a shuffling of data bits between two 16-bit pieces of information in an alternating fashion. "Shuffle" as referred to herein in this document refers to any rearrangement, manipulation, shift, or transposition of data. First multiplexer 16 may also receive two control bits that select between the four operations which generate four potential outputs 22a–22d as illustrated in FIG. 1. The control bits may be included in the incoming data stream and positioned there by any suitable object or element. These four operations are offered for purposes of teaching only and may vary significantly where appropriate according to particular needs. Additionally, there may be a host of other potential operations to be included within first multiplexer 16 in order to suitably process the data communicated by source 12. Additional details relating to these example operations are provided below with reference to FIG. 2.

Second multiplexer 18 is a data processing element that receives an input from first multiplexer 16 and provides one of several potential outputs 24a–24f. The output from second multiplexer 18 may be communicated back to register element 14, to first multiplexer 16, or to logic unit 20. Second multiplexer 18 includes six potential outputs 24a–24f in an example embodiment of the present invention. Output 24a represents a pass in which the information communicated from first multiplexer 16 is communicated through second multiplexer 18 without producing a change to the input data stream. Output 24b represents an 8-bit least significant bit (LSB) replication. The 8-bit LSB is represented as the last bit in each of a set of 8-bit sections of a 32-bit word received as an input data stream by second multiplexer 18. Output 24c represents an 8-bit most significant bit (MSB) replication. The 8-bit MSB is represented as the first bit in each of a set of 8-bit sections of input data within a 32-bit word. Output 24d is a 16-bit LSB that represents the 16th bit in each of two 16-bit segments within the 32-bit word input. Output 24e represents a 16-bit MSB which designates the first bit in each of two 16-bit segments to be replicated and communicated to a next destination, such as logic unit 20. Output 24f represents a 32-bit MSB replication in which the first bit of a 32-bit segment is replicated and communicated to logic unit 20. Second multiplexer 18 may also receive three control bits that select which of the operations are to be selected and executed by second multiplexer 18 in order to generate outputs 24a–24f. The control bits may be included in the incoming data stream and positioned there by any suitable object or element. Additional details relating to these six operations are provided below with reference to FIG. 2.

Second multiplexer 18 may communicate the selected output to any number of next destinations such as logic output 20, first multiplexer 16, or register element 14. In this fashion and where appropriate, the data stream outputs from each of first multiplexer 16 and second multiplexer 18 may pass several times through portions of data processing system 10 before being communicated to logic unit 20. Once a suitable result is generated, this output may be communicated to any suitable next destination. Such a destination may be logic unit 20 or a register file for example. The register file may receive the output directly and communicate it to a next destination without passing through logic unit 20 where appropriate. The number of passes and processing protocol may be dictated by an instruction set from instruction memory 30 or alternatively programmed or otherwise downloaded by first multiplexer 16 and/or second multiplexer 18.

In addition, the number of passes through first multiplexer 16 and second multiplexer 18 may be influenced by a clocking or a timing element. In such a case any suitable synchronizing element, such as a register for example, may control the multiple cycles through various elements of data processing system 10. Register files and retiming registers may also be implemented where appropriate in order to ensure the requisite number of passes through first multiplexer 16 and second multiplexer 18.

The decision as to which resultant is to be generated by the selected operation within first multiplexer 16 and second multiplexer 18 may be determined by instructions received from instruction memory 30. First multiplexer 16 and second multiplexer 18 may each generate a series of potential outputs after receiving an input data stream and further select which output be communicated to a next destination based on the information provided by instruction memory 30. Alternatively, first multiplexer 16 and second multiplexer 18 may download instructions from another component or element or have such a processing protocol built or otherwise programmed into their internal structure using suitable software or hardware.

Logic unit 20 is a binary processing element that receives an input from second multiplexer 18 and generates a result that reflects both outputs from first multiplexer 16 and second multiplexer 18. Logic unit 20 may be part of a processor where appropriate that executes arithmetic and logic operations on operands. Logic unit 20 may be designed to perform any arithmetic operation in order to generate a suitable result to be communicated to a next destination. Logic unit 20 may receive an input consisting of an instruction word (referred to as a machine-instruction word) from any suitable source. The input may include an operation code (referred to as an op-code), one or more operands, and in certain scenarios, a format code. The operation code may instruct logic unit 20 which operation to perform on the incoming data and the operand to be used in the corresponding operation. For example, two operands may be added together or compared logically. The format code may be combined with the op-code and may indicate, for example, whether a fixed point or a floating point instruction is provided. Logic unit 20 may generally operate to store or to add input operands, to accumulate a result, and to shift results where appropriate. The flow of incoming bits and the operations performed on the bits received by logic unit 20 may be controlled by internal gated circuits. The gates within the circuits may be controlled by a sequence logic unit using a particular algorithm or sequence for each operation code.

Logic unit 20 may have multiple inputs 34. Each of inputs 34 may represent two binary conditions, low (0) or high (1), represented by different voltage levels. The logic state of inputs 34 may change as associated circuits process data. Logic unit 20 may be an AND gate, an OR gate, an XOR gate, a NOT gate, a NAND gate, a NOR gate, or an XNOR gate. Additionally, logic unit 20 may be any combination or structure that includes several of these logic gates combined into a single unit. Logic unit 20 may receive particular operation codes that instruct logic unit 20 to combine various inputs 34 with the input received from second multiplexer 18.

Logic unit 20 may be coupled to or inclusive of a barrel rotator used to rearrange, shift, or scramble data being processed within data processing system 10. The input received by logic unit 20 from second multiplexer 18 may be generally as wide as an associated data bus or in the format implemented by source 12 in communicating to register element 14. Alternatively, logic unit 20 may receive data in any suitable format such that a result may be generated by logic unit 20 that reflects the operations provided by first multiplexer 16 and second multiplexer 18. Logic unit 20 may generate a result that is communicated to register element 14 whereby the result is passed through first multiplexer 16 and second multiplexer 18 for further processing before being communicated out of data processing system 10. Logic unit 20 may perform this passing of a resultant through data processing system 10 any suitable number of times before communicating the resultant to an appropriate next destination.

Control bus 26 is a communications interface that provides a transmission path for signals to be communicated to any element within data processing system 10. Control bus 26 provides a communications medium for instruction memory 30 according to a particular embodiment of the present invention. The implementation of control bus 26 represents a network topology or circuit arrangement in which all devices within data processing system 10 may be attached directly or indirectly to control bus 26 and all signals generated by control bus 26 may be communicated to each of the devices. Each component or element within data processing system 10 may include a unique identity and recognize signals communicated by control bus 26 that are intended specifically for each of them. Control bus 26 is coupled to register element 14, first multiplexer 16, second multiplexer 18, and logic unit 20.

Instruction memory 30 is a memory element that stores a series of instructions to be provided to various elements within data processing system 10. Instruction memory 30 may be any random access memory (RAM), read-only memory (ROM), field programmable gate array (FPGA), erasable programmable read-only memory (EPROM), electrically erasable programmable read-only memory (EEPROM), application-specific integrated circuit (ASIC), microcontroller, or microprocessor element, device, component or object that communicates instructions to elements within data processing system 10. Instruction memory 30 may include any suitable hardware, software, or programs that dictate which components within data processing system 10 receive designated instructions or, alternatively, instruction memory 30 may download suitable instructions to be provided to each of the components within data processing system 10. Instruction memory 30 may also indicate which operations are to be performed by first multiplexer 16 and second multiplexer 18 such that selected outputs are generated and communicated to a next destination. Instruction memory 30 may also provide instructions to logic unit 20 such that logic unit 20 may combine several inputs 34 with the output from second multiplexer 18. Inputs 34 may be communicated from any suitable source, component, element, device, or object, such as an integrated circuit designed to function in cooperation with data processing system 10, for example. In addition, instruction memory 30 may provide a protocol for determining the number of times in which data is passed through data processing system 10 before being communicated from each component to its next destination. Instructions from instruction memory 30 may be decoded where appropriate before being communicated to control bus 26 and then on to selected components within data processing system 10. Instruction memory 30 operates to direct overall communications flow in receiving information from source 12 and generating selected aspects or modifications of that information to be produced as a final result communicated by logic unit 20.

Data processing system 10 may be used in any communications environment where binary data is communicated. For example, data processing system 10 may be used in a digital environment for video applications in which video data is sought to be rearranged, scrambled, swizzled, modified, or otherwise processed before being communicated to a next destination. In such an application, specific data segments may be selected and operations performed thereon in order to produce a resultant that reflects a set of selected outputs. One such example video application could be in pixel formatting where pixels are modified or changed in order to represent data in a selected arrangement or protocol. A pixel is a unit of programmable color that is generally directed to a computer display or contained within a computer image. Pixels may be generally in 4, 8, 16, or 32-bit data segment formats to be communicated for display. The physical size of a pixel depends on the associated resolution for a given display and generally equals the physical size of the dot pitch of the display. The specific color that a pixel describes is a combination of colors from the color spectrum. In certain circumstances, it may be beneficial to modify these picture colors or provide some transparency function, where appropriate, in order to achieve a selected output.

Additionally, pixels represent an application in which only selected or specific pieces of data may require some enhanced processing in order to produce a desired result. Numerous operations may be performed on a pixel. For example, a comparison may be made between a pixel and a predetermined value in order to verify that a particular color has been appropriately represented. This comparison may be recorded as a single-bit result and if this operation is performed in parallel on four pixels simultaneously, four bits of resultant data may be produced. The result may indicate whether a pixel has a certain desired value. A series of these results may be built up into an appropriate storage area which reflects a concatenation of several four-bit results. The end result may be a 32-bit register file with the results of 32 comparisons contained within a corresponding data storage unit.

Subsequently it may be desirable to perform an operation on a specific pixel (such as a transparency function in order to replace a particular pixel). Thus, a pixel having an undesired value or result may be changed from one value to another. Accordingly, an operation is needed whereby certain packed data may be expanded out to control sections of the data path in order to perform different operations on different parts of the data path simultaneously. Packed data refers to a data stream that is as wide as potentially the data path. The data path may be 32 bits, 64 bits, 128 bits, or any other suitable data communication width.

Figure 2:
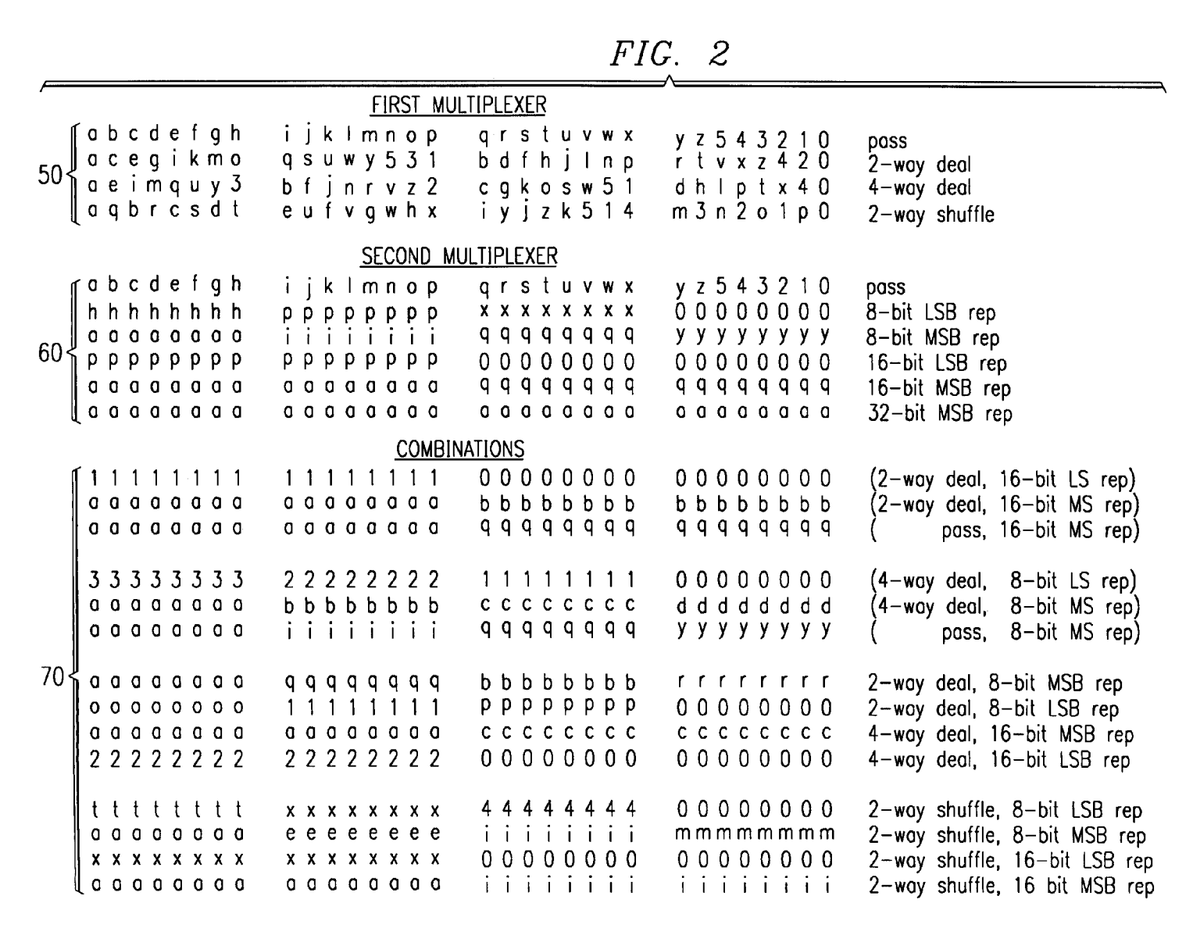
FIG. 2 is a diagram illustrating a series of operations to be executed by the processing system and the associated results of the operations.

FIG. 2 is a diagram illustrating a series of potential outputs with associated operations generated by first multiplexer 16 and second multiplexer 18. FIG. 2 includes a resultant block 50 for first multiplexer 16 and a resultant block 60 for second multiplexer 18. Each of resultant blocks 50 and 60 represent example operations to be executed by first multiplexer 16 and second multiplexer 18 respectively and their associated results. These operations are provided only for purposes of teaching and should in no way limit the various other operations that may be executed by and included within first multiplexer 16 and second multiplexer 18. Additionally, a third resultant block 70 is provided with various example potential combinations for effecting some change or performing some processing of a data stream being communicated through data processing system 10.

Resultant block 50 includes a series of operations to be executed on a data stream including a pass, a two-way deal, a four-way deal, and a two-way shuffle. These operations are reflected by outputs 22a–22d of first multiplexer 16 as illustrated in FIG. 1. The pass operation represents no change in the data received from register element 14 as first multiplexer 16 passes a 32 bit word unchanged to second multiplexer 18. The two-way deal operation as illustrated in resultant block 50 represents an output in which every other bit (perhaps each of the odd bits for example) is selected and produced as a result to be communicated to second multiplexer 18. The four-way deal operation represents an output in which every fourth bit is selected from the input data stream and communicated to second multiplexer 18. The two-way shuffle operation illustrated in resultant block 50 represents a series of sequential bits from alternating 16-bit segments of data that are selected and communicated to second multiplexer 18.

Resultant block 60 represents a series of operations that correlate to outputs 24a–24f as illustrated in FIG. 1 to be executed by second multiplexer 18. For purposes of clarity and for an enhanced understanding of the teachings of the present invention, the resultant outputs illustrated in resultant block 60 are based on a pass operation executed by first multiplexer 16. The first operation illustrated in resultant block 60 represents a second pass of information in which data is unchanged and communicated directly to logic unit 20. The second operation illustrated by resultant block 60 represents an 8-bit LSB replication in which the LSB from each of four 8-bit data segments of a data stream is replicated. The third operation illustrated by resultant block 60 represents an 8-bit MSB replication in which the most significant bit from each of four 8-bit data segments is replicated and provided to logic unit 20. The fourth operation illustrated in FIG. 2 represents a 16-bit LSB replication in which the LSB from each of two 16-bit data segments is communicated by second multiplexer 18 to logic unit 20. The fifth operation illustrated in resultant block 60 represents each of two 16-bit MSB replications that may be communicated to logic unit 20. The sixth operation represented is a 32-bit MSB replication in which the first bit of the 32-bit word is replicated and provided as an output to be communicated to logic unit 20.

Combinations block 70 represents a series of additional example operations and corresponding outputs associated with first multiplexer 16 and second multiplexer 18. These combinations may use the operations previously described in resultant block 50 and resultant block 60. Combinations block 70 also offers an example of a portion of the various ways in which the offered example operations of first multiplexer 16 and second multiplexer 18 may be combined. As described above, first multiplexer 16 and second multiplexer 18 may alternatively execute any suitable additional operations in order to achieve a desired result to be communicated to logic unit 20. For example, first multiplexer 16 or second multiplexer 18 may perform a four-way shuffle or an eight-way shuffle in order to produce a selected output to be communicated to logic unit 20.

Figure 3:
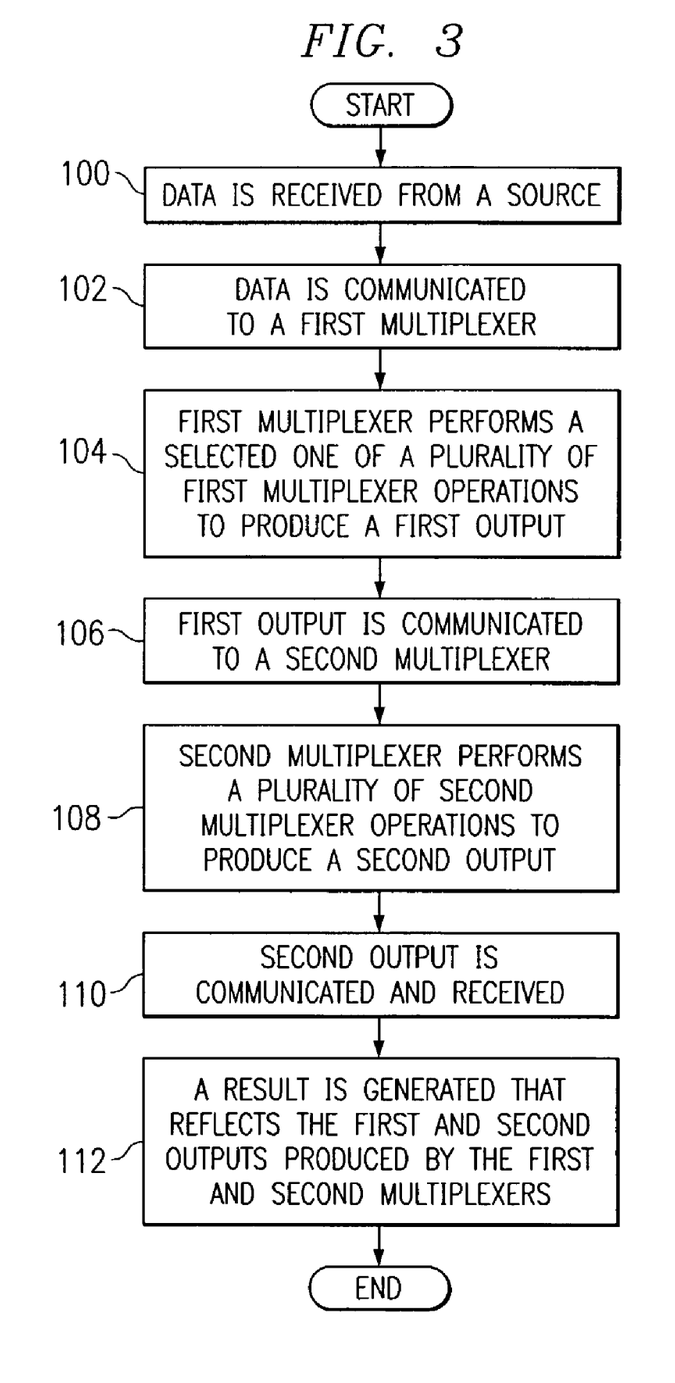
FIG. 3 is a flow chart illustrating a series of steps associated with a method for processing data.

FIG. 3 is a flowchart that illustrates a series of steps associated with a method of processing data. The method begins at step 100 where data is received from source 12. The data is then communicated to first multiplexer 16 in order to perform a selected one of a plurality of operations on the data at step 102. First multiplexer 16 produces a first output (any one of outputs 22a–22d) based on the selected operation at step 104. The first output is then communicated to second multiplexer 18 at step 106. Second multiplexer 18 receives the first output and performs a selected one of a plurality of second multiplexer operations on the first output such that a second output (any one of outputs 24a–24f) is produced at step 108. Each of first multiplexer 16 and second multiplexer 18 may receive suitable instruction sets from instruction memory 30 indicating which of the operations are to be performed on the data. First multiplexer 16 and second multiplexer 18 may also discard portions of the data in order to generate the first and second outputs respectively.

At step 110, the second output is communicated and received at a next destination, such as logic unit 20 for example. Logic unit 20 may also receive multiple additional inputs 34 and combine them with the second output generated by second multiplexer 18. A plurality of operation codes may be communicated to logic unit 20 that indicate a manner in which inputs 34 and the second output are combined in order to produce the result. A result that reflects the first and second outputs produced by first multiplexer 16 and second multiplexer 18 is then generated at step 112.

Although the present invention has been described with reference to particular embodiments, it should be understood that various other changes, substitutions, and alterations may be made hereto without departing from the spirit and scope of the present invention. For example, although data processing system 10 has been described with reference to example video applications, data processing system 10 may be used in other suitable digital communication applications, such as where it is desired to interleave data in order to diffuse a set of errors across multiple data words. For example, in addressing inconsistent data streams (e.g. bursting or latency factors) in mobile communications, data processing system 10 may operate to dilute or otherwise separate a series of errors over several data words. This operation may allow for less errors per block or unit of data and therefore provide the capability for those errors to be more clearly pinpointed or targeted for error correction. Thus, data processing system 10 provides a correction capability by offering some redundancy functions to a given data stream. Accordingly, data processing system 10 may be used to perform operations on the data to be transmitted, before an interleaving function is performed, in order to achieve this redundancy.

In addition, although some of the embodiments offered illustrate only two multiplexers (first multiplexer 16 and second multiplexer 18), a series of multiplexers (configured in any suitable fashion) may be used where appropriate and according to particular needs. The use of two multiplexers in the provided embodiments have only been offered for purposes of simplicity in teaching the present invention. This particular implementation should not be construed to limit the scope of the invention in any way. Where more than two multiplexers are implemented, additional associated elements within data processing system 10 may also be provided.

Numerous other changes, substitutions, variations, alterations, and modifications may be ascertained by those skilled in the art and it is intended that the present invention encompass all such changes, substitutions, variations, alterations, and modifications as falling within the spirit and scope of the appended claims. Moreover, the present invention is not intended to be limited in any way by any statement in the specification that is not otherwise reflected in the appended claims.

What is claimed is:

1. An apparatus for processing data, the apparatus comprising:

a first multiplexer operable to receive data and to perform a selected one of a plurality of first multiplexer operations on the data such that a first output is produced, said plurality of first multiplexer operations including a pass operation passing said received data unchanged to said first output and a plurality of bit rearrangement operations in which each bit in said first output except a most significant bit and a least significant bit are in a different bit position than in said received data;

a second multiplexer coupled to the first multiplexer and operable to receive the first output from the first multiplexer and to perform a selected one of a plurality of second multiplexer operations on the first output such that a second output is produced, said plurality of second multiplexer operations including a pass operation passing said first output from said first multiplexer unchanged to said second output and a plurality of bit duplication operations in which a selected bit or bits in said first output is duplicated in a corresponding block of contiguous bits in said second output; and a logic unit coupled to the second multiplexer and operable to receive the second output from the second multiplexer and to generate a result that reflects the first and second outputs produced by the first and second multiplexers respectively.

2. The apparatus of claim 1, wherein the logic unit receives a plurality of inputs and combines the inputs with the second output produced by the second multiplexer in order to generate the result.

3. The apparatus of claim 1, wherein the first multiplexer is operable to provide a selected one of four formats of the data as the first output, and wherein each of the formats correspond to a selected one of the first multiplexer operations.

4. The apparatus of claim 1, wherein the second multiplexer is operable to provide a selected one of six formats of the data as the second output, and wherein each of the formats correspond to a selected one of the second multiplexer operations.

5. A method for processing data, comprising:

receiving data from a source;

performing a selected one of a plurality of first multiplexer operations on the data such that a first output is produced, said plurality of first multiplexer operations including a pass operation passing said received data unchanged to said first output and a plurality of bit rearrangement operations in which each bit in said first output except a most significant bit and a least significant bit are in a different bit position than in said received data;

performing a selected one of a plurality of second multiplexer operations on the first output such that a second output is produced, said plurality of second multiplexer operations including a pass operation passing said first output from said first multiplexer unchanged to said second output and a plurality of bit duplication operations in which a selected bit or bits in said first output is duplicated in a corresponding block of contiguous bits in said second output; and generating a result that reflects the first and second outputs produced by first and second multiplexers respectively.

6. The method of claim 5, further comprising:

receiving a plurality of inputs; and combining the plurality of inputs with the second output produced by the second multiplexer in order to generate the result.

7. The method of claim 5, further comprising:
generating a selected one of four formats of the data as the first output, wherein each of the four formats correspond to a selected one of the plurality of first multiplexer operations.

8. The method of claim 7, further comprising:
generating a selected one of six formats of the data as the second output, wherein each of the six formats correspond to a selected one of the plurality of second multiplexer operations.

9. A system for processing data, comprising:
means for receiving data from a source;
means for performing a selected one of a plurality of first multiplexer operations on the data such that a first output is produced, said plurality of first multiplexer operations including a pass operation passing said received data unchanged to said first output and a plurality of bit rearrangement operations in which each bit in said first output except a most significant bit and a least significant bit are in a different bit position than in said received data;
means for performing a selected one of a plurality of second multiplexer operations on the first output such that a second output is produced, said plurality of second multiplexer operations including a pass operation passing said first output from said first multiplexer unchanged to said second output and a plurality of bit duplication operations in which a selected bit or bits in said first output is duplicated in a corresponding block of contiguous bits in said second output; and
means for generating a result that reflects the first and second outputs produced by first and second multiplexers respectively.

10. The system of claim 9, further comprising means for receiving a plurality of inputs; and
means for combining the inputs with the second output produced by the second multiplexer in order to generate the result.

11. A computer readable medium having code for processing data, the code operable to:
perform a selected one of a plurality of first multiplexer operations on the data such that a first output is produced, said plurality of first multiplexer operations including a pass operation passing said received data unchanged to said first output and a plurality of bit rearrangement operations in which each bit in said first output except a most significant bit and a least significant bit are in a different bit position than in said received data;
perform a selected one of a plurality of second multiplexer operations on the first output such that a second output is produced, said plurality of second multiplexer operations including a pass operation passing said first output from said first multiplexer unchanged to said second output and a plurality of bit duplication operations in which a selected bit or bits in said first output is duplicated in a corresponding block of contiguous bits in said second output; and
generate a result that reflects the first and second outputs produced by first and second multiplexers respectively.

12. The code of claim 11, further operable to receive a plurality of inputs; and
combine the inputs with the second output produced by the second multiplexer in order to generate the result.

13. An apparatus for processing data, the apparatus comprising:
a first multiplexer operable to receive data and to perform a selected one of a plurality of first multiplexer operations on the data such that a first output is produced, said plurality of first multiplexer operations including a pass operation passing said received data unchanged to said first output and a plurality of bit rearrangement operations in which each bit in said first output except a most significant bit and a least significant bit are in a different bit position than in said received data;
a second multiplexer coupled to the first multiplexer and operable to receive the first output from the first multiplexer and to perform a selected one of a plurality of second multiplexer operations on the first output such that a second output is produced, said plurality of second multiplexer operations including a pass operation passing said first output from said first multiplexer unchanged to said second output and a plurality of bit duplication operations in which a selected bit or bits in said first output is duplicated in a corresponding block of contig-uous bits in said second output; and
a register file coupled to the second multiplexer and operable to receive the second output from the second multiplexer and to communicate a result that reflects the first and second outputs produced by the first and second multiplexers respectively.

14. The apparatus of claim 1, wherein:
said plurality of bit rearrangement operations of said first multiplexer operations includes at least one deal operation in which a next bit of said received data is placed in a next bit location in a next block of contiguous bits of a plurality of blocks of contiguous bits in said first output.

15. The apparatus of claim 14, wherein:
said plurality of blocks of contiguous bits in said first output includes two blocks of contiguous bits.

16. The apparatus of claim 14, wherein:
said plurality of blocks of contiguous bits in said first output includes four blocks of contiguous bits.

17. The apparatus of claim 1, wherein:
said plurality of bit rearrangement operations of said first multiplexer operations includes at least one shuffle operation in which a next bit in a next block of contiguous bits of a plurality of blocks of contiguous bits of said received data is placed in a next bit location in said first output.

18. The apparatus of claim 1, wherein:
said plurality of bit rearrangement operations of said first multiplexer operations includes
a first deal operation in which a next bit of said received data is placed in a next bit location in a next block of contiguous bits of two blocks of contiguous bits in said first output,
a second deal operation in which a next bit of said received data is placed in a next bit location in a next block of contiguous bits of four blocks of contiguous bits in said first output, and
a shuffle operation in which a next bit in a next block of contiguous bits of two blocks of contiguous bits of said received data is placed in a next bit location in said first output.

19. The apparatus of claim 1, wherein:
said plurality of bit duplication operations divides said first output and said second output into a plurality of blocks of contiguous bits and duplicates a selected bit from each block of contiguous bits of said first output into all bits of a corresponding block of contiguous bits in said second output.

20. The apparatus of claim 19, wherein:
said selected bit from each block of contiguous bits of said first output is a most significant bit of said block of contiguous bits.

21. The apparatus of claim 20, wherein:
said plurality of blocks of contiguous bits includes four blocks of bits.

22. The apparatus of claim 20, wherein:
said plurality of blocks of contiguous bits includes two blocks of bits.

23. The apparatus of claim 19, wherein:
said selected bit from each block of contiguous bits of said first output is a least significant bit of said block of contiguous bits.

24. The apparatus of claim 23, wherein:
said plurality of blocks of contiguous bits includes four blocks of bits.

25. The apparatus of claim 23, wherein:
said plurality of blocks of contiguous bits includes two blocks of bits.

26. The apparatus of claim 1, wherein:
said plurality of bit duplication operations includes a bit duplication operation that duplicates a selected bit of said first output into all bits of said second output.

27. The apparatus of claim 26, wherein:
said selected bit from said first output is a most significant bit of said first output.

28. The apparatus of claim 1, wherein:
said plurality of bit duplication operations includes
a first bit duplication operation that divides said first output and said second output into four blocks of contiguous bits and duplicates a most significant bit from each block of contiguous bits of said first output into all bits of a corresponding block of contiguous bits in said second output,
a second bit duplication operation that divides said first output and said second output into four blocks of contiguous bits and duplicates a least significant bit from each block of contiguous bits of said first output into all bits of a corresponding block of contiguous bits in said second output,
a third bit duplication operation that divides said first output and said second output into two blocks of contiguous bits and duplicates a most significant bit from each block of contiguous bits of said first output into all bits of a corresponding block of contiguous bits in said second output,
a fourth bit duplication operation that divides said first output and said second output into two blocks of contiguous bits and duplicates a least significant bit from each block of contiguous bits of said first output into all bits of a corresponding block of contiguous bits in said second output, and
a fifth bit duplication operation that duplicates a most significant bit from said first output into all bits of said second output.

29. The method of claim 5, wherein:
said plurality of bit rearrangement operations of said first multiplexer operations includes at least one deal operation in which a next bit of said received data is placed in a next bit location in a next block of contiguous bits of a plurality of blocks of contiguous bits in said first output.

30. The method of claim 29, wherein:
said plurality of blocks of contiguous bits in said first output includes two blocks of contiguous bits.

31. The method of claim 29, wherein:
said plurality of blocks of contiguous bits in said first output includes four blocks of contiguous bits.

32. The method of claim 5, wherein:
said plurality of bit rearrangement operations of said first multiplexer operations includes at least one shuffle operation in which a next bit in a next block of contiguous bits of a plurality of blocks of contiguous bits of said received data is placed in a next bit location in said first output.

33. The method of claim 5, wherein:
said plurality of bit rearrangement operations of said first multiplexer operations includes
a first deal operation in which a next bit of said received data is placed in a next bit location in a next block of contiguous bits of two blocks of contiguous bits in said first output,
a second deal operation in which a next bit of said received data is placed in a next bit location in a next block of contiguous bits of four blocks of contigubus bits in said first output, and
a shuffle operation in which a next bit in a next block of contiguous bits of two blocks of contiguous bits of said received data is placed in a next bit location in said first output.

34. The method of claim 5, wherein:
said plurality of bit duplication operations divides said first output and said second output into a plurality of blocks of contiguous bits and duplicates a selected bit from each block of contiguous bits of said first output into all bits of a corresponding block of contiguous bits in said second output.

35. The method of claim 34, wherein:
said selected bit from each block of contiguous bits of said first output is a most significant bit of said block of contiguous bits.

36. The method of claim 35, wherein:
said plurality of blocks of contiguous bits includes four blocks of bits.

37. The method of claim 35, wherein:
said plurality of blocks of contiguous bits includes two blocks of bits.

38. The method of claim 34, wherein:
said selected bit from each block of contiguous bits of said first output is a least significant bit of said block of contiguous bits.

39. The method of claim 36, wherein:
said plurality of blocks of contiguous bits includes four blocks of bits.

40. The method of claim 36, wherein:
said plurality of blocks of contiguous bits includes two blocks of bits.

41. The method of claim 5, wherein:
said plurality of bit duplication operations includes a bit duplication operation that duplicates a selected bit of said first output into all bits of said second output.

42. The method of claim 41, wherein:
said selected bit from said first output is a most significant bit of said first output.

43. The method of claim 5, wherein:
said plurality of bit duplication operations includes
a first bit duplication operation that divides said first output and said second output into four blocks of contiguous bits and duplicates a most significant bit from each block of contiguous bits of said first output into all bits of a corresponding block of contiguous bits in said second output,
  a second bit duplication operation that divides said first output and said second output into four blocks of contiguous bits and duplicates a least significant bit from each block of contiguous bits of said first output into all bits of a corresponding block of contiguous bits in said second output,
  a third bit duplication operation that divides said first output and said second output into two blocks of contiguous bits and duplicates a most significant bit from each block of contiguous bits of said first output into all bits of a corresponding block of contiguous bits in said second output,
  a fourth bit duplication operation that divides said first output and said second output into two blocks of contiguous bits and duplicates a least significant bit from each block of contiguous bits of said first output into all bits of a corresponding block of contiguous bits in said second output, and
  a fifth bit duplication operation that duplicates a most significant bit from said first output into all bits of said second output.

44. The system of claim 9, wherein:
said plurality of bit rearrangement operations of said first multiplexer operations includes at least one deal operation in which a next bit of said received data is placed in a next bit location in a next block of contiguous bits of a plurality of blocks of contiguous bits in said first output.

45. The system of claim 44, wherein:
said plurality of blocks of contiguous bits in said first output includes two blocks of contiguous bits.

46. The system of claim 44, wherein:
said plurality of blocks of contiguous bits in said first output includes four blocks of contiguous bits.

47. The system of claim 9, wherein:
said plurality of bit rearrangement operations of said first multiplexer operations includes at least one shuffle operation in which a next bit in a next block of contiguous bits of a plurality of blocks of contiguous bits of said received data is placed in a next bit location in said first output.

48. The system of claim 9, wherein:
said plurality of bit rearrangement operations of said first multiplexer operations includes
  a first deal operation in which a next bit of said received data is placed in a next bit location in a next block of contiguous bits of two blocks of contiguous bits in said first output,
  a second deal operation in which a next bit of said received data is placed in a next bit location in a next block of contiguous bits of four blocks of contiguous bits in said first output, and
  a shuffle operation in which a next bit in a next block of contiguous bits of two blocks of contiguous bits of said received data is placed in a next bit location in said first output.

49. The system of claim 9, wherein:
said plurality of bit duplication operations divides said first output and said second output into a plurality of blocks of contiguous bits and duplicates a selected bit from each block of contiguous bits of said first output into all bits of a corresponding block of contiguous bits in said second output.

50. The system of claim 40, wherein:
said selected bit from each block of contiguous bits of said first output is a most significant bit of said block of contiguous bits.

51. The system of claim 50, wherein:
said plurality of blocks of contiguous bits includes four blocks of bits.

52. The system of claim 50, wherein:
said plurality of blocks of contiguous bits includes two blocks of bits.

53. The system of claim 50, wherein:
said selected bit from each block of contiguous bits of said first output is a least significant bit of said block of contiguous bits.

54. The system of claim 49, wherein:
said plurality of blocks of contiguous bits includes four blocks of bits.

55. The system of claim 54, wherein:
said plurality of blocks of contiguous bits includes two blocks of bits.

56. The system of claim 9, wherein:
said plurality of bit duplication operations includes a bit duplication operation that duplicates a selected bit of said first output into all bits of said second output.

57. The system of claim 56, wherein:
said selected bit from said first output is a most significant bit of said first output.

58. The system of claim 9, wherein:
said plurality of bit duplication operations includes
  a first bit duplication operation that divides said first output and said second output into four blocks of contiguous bits and duplicates a most significant bit from each block of contiguous bits of said first output into all bits of a corresponding block of contiguous bits in said second output,
  a second bit duplication operation that divides said first output and said second output into four blocks of contiguous bits and duplicates a least significant bit from each block of contiguous bits of said first output into all bits of a corresponding block of contiguous bits in said second output,
  a third bit duplication operation that divides said first output and said second output into two blocks of contiguous bits and duplicates a most significant bit from each block of contiguous bits of said first output into all bits of a corresponding block of contiguous bits in said second output,
  a fourth bit duplication operation that divides said first output and said second output into two blocks of contiguous bits and duplicates a least significant bit from each block of contiguous bits of said first output into all bits of a corresponding block of contiguous bits in said second output, and
  a fifth bit duplication operation that duplicates a most significant bit from said first output into all bits of said second output.

59. The code of claim 11, wherein:
said plurality of bit rearrangement operations of said first multiplexer operations includes at least one deal operation in which a next bit of said received data is placed in a next bit location in a next block of contiguous bits of a plurality of blocks of contiguous bits in said first output.

60. The code of claim 59, wherein:
said plurality of blocks of contiguous bits in said first output includes two blocks of contiguous bits.

61. The code of claim 59, wherein:
said plurality of blocks of contiguous bits in said first output includes four blocks of contiguous bits.

62. The code of claim 11, wherein:
said plurality of bit rearrangement operations of said first multiplexer operations includes at least one shuffle operation in which a next bit in a next block of contiguous bits of a plurality of blocks of contiguous bits of said received data is placed in a next bit location in said first output.

63. The code of claim 11, wherein:
said plurality of bit rearrangement operations of said first multiplexer operations includes
 a first deal operation in which a next bit of said received data is placed in a next bit location in a next block of contiguous bits of two blocks of contiguous bits in said first output,
 a second deal operation in which a next bit of said received data is placed in a next bit location in a next block of contiguous bits of four blocks of contiguous bits in said first output, and
 a shuffle operation in which a next bit in a next block of contiguous bits of two blocks of contiguous bits of said received data is placed in a next bit location in said first output.

64. The code of claim 11, wherein:
said plurality of bit duplication operations divides said first output and said second output into a plurality of blocks of contiguous bits and duplicates a selected bit from each block of contiguous bits of said first output into all bits of a corresponding block of contiguous bits in said second output.

65. The code of claim 64, wherein:
said selected bit from each block of contiguous bits of said first output is a most significant bit of said block of contiguous bits.

66. The code of claim 65, wherein:
said plurality of blocks of contiguous bits includes four blocks of bits.

67. The code of claim 65, wherein:
said plurality of blocks of contiguous bits includes two blocks of bits.

68. The code of claim 64, wherein:
said selected bit from each block of contiguous bits of said first output is a least significant bit of said block of contiguous bits.

69. The code of claim 68, wherein:
said plurality of blocks of contiguous bits includes four blocks of bits.

70. The code of claim 68, wherein:
said plurality of blocks of contiguous bits includes two blocks of bits.

71. The code of claim 11, wherein:
said plurality of bit duplication operations includes a bit duplication operation that duplicates a selected bit of said first output into all bits of said second output.

72. The code of claim 71, wherein:
said selected bit from said first output is a most significant bit of said first output.

73. The code of claim 11, wherein:
said plurality of bit duplication operations includes
 a first bit duplication operation that divides said first output and said second output into four blocks of contiguous bits and duplicates a most significant bit from each block of contiguous bits of said first output into all bits of a corresponding block of contiguous bits in said second output,
 a second bit duplication operation that divides said first output and said second output into four blocks of contiguous bits and duplicates a least significant bit from each block of contiguous bits of said first output into all bits of a corresponding block of contiguous bits in said second output,
 a third bit duplication operation that divides said first output and said second output into two blocks of contiguous bits and duplicates a most significant bit from each block of contiguous bits of said first output into all bits of a corresponding block of contiguous bits in said second output,
 a fourth bit duplication operation that divides said first output and said second output into two blocks of contiguous bits and duplicates a least significant bit from each block of contiguous bits of said first output into all bits of a corresponding block of contiguous bits in said second output, and
 a fifth bit duplication operation that duplicates a most significant bit from said first output into all bits of said second output.

74. The apparatus of claim 13, wherein:
said plurality of bit rearrangement operations of said first multiplexer operations includes at least one deal operation in which a next bit of said received data is placed in a next bit location in a next block of contiguous bits of a plurality of blocks of contiguous bits in said first output.

75. The apparatus of claim 74, wherein:
said plurality of blocks of contiguous bits in said first output includes two blocks of contiguous bits.

76. The apparatus of claim 74, wherein:
said plurality of blocks of contiguous bits in said first output includes four blocks of contiguous bits.

77. The apparatus of claim 13, wherein:
said plurality of bit rearrangement operations of said first multiplexer operations includes at least one shuffle operation in which a next bit in a next block of contiguous bits of a plurality of blocks of contiguous bits of said received data is placed in a next bit location in said first output.

78. The apparatus of claim 13, wherein:
said plurality of bit rearrangement operations of said first multiplexer operations includes
 a first deal operation in which a next bit of said received data is placed in a next bit location in a next block of contiguous bits of two blocks of contiguous bits in said first output,
 a second deal operation in which a next bit of said received data is placed in a next bit location in a next block of contiguous bits of four blocks of contiguous bits in said first output, and
 a shuffle operation in which a next bit in a next block of contiguous bits of two blocks of contiguous bits of said received data is placed in a next bit location in said first output.

79. The apparatus of claim 13, wherein:
said plurality of bit duplication operations divides said first output and said second output into a plurality of blocks of contiguous bits and duplicates a selected bit from each block of contiguous bits of said first output into all bits of a corresponding block of contiguous bits in said second output.

80. The apparatus of claim 79, wherein:
said selected bit from each block of contiguous bits of said first output is a most significant bit of said block of contiguous bits.

81. The apparatus of claim 80, wherein:
said plurality of blocks of contiguous bits includes four blocks of bits.

82. The apparatus of claim 80, wherein:
said plurality of blocks of contiguous bits includes two blocks of bits.

83. The apparatus of claim 78, wherein:
said selected bit from each block of contiguous bits of said first output is a least significant bit of said block of contiguous bits.

84. The apparatus of claim 83, wherein:
said plurality of blocks of contiguous bits includes four blocks of bits.

85. The apparatus of claim 83, wherein:
said plurality of blocks of contiguous bits includes two blocks of bits.

86. The apparatus of claim 13, wherein:
said plurality of bit duplication operations includes a bit duplication operation that duplicates a selected bit of said first output into all bits of said second output.

87. The apparatus of claim 86, wherein:
said selected bit from said first output is a most significant bit of said first output.

88. The apparatus of claim 13, wherein:
said plurality of bit duplication operations includes
 a first bit duplication operation that divides said first output and said second output into four blocks of contiguous bits and duplicates a most significant bit from each block of contiguous bits of said first output into all bits of a corresponding block of contiguous bits in said second output,
 a second bit duplication operation that divides said first output and said second output into four blocks of contiguous bits and duplicates a least significant bit from each block of contiguous bits of said first output into all bits of a corresponding block of contiguous bits in said second output,
 a third bit duplication operation that divides said first output and said second output into two blocks of contiguous bits and duplicates a most significant bit from each block of contiguous bits of said first output into all bits of a corresponding block of contiguous bits in said second output,
 a fourth bit duplication operation that divides said first output and said second output into two blocks of contiguous bits and duplicates a least significant bit from each block of contiguous bits of said first output into all bits of a corresponding block of contiguous bits in said second output, and
 a fifth bit duplication operation that duplicates a most significant bit from said first output into all bits of said second output.

* * * * *